United States Patent Office 2,824,892
Patented Feb. 25, 1958

2,824,892

METHOD OF CARBOXYLATING PHENOLS

Lloyd B. Barkley, Kirkwood, Mo., assignor to Monsanto Chemical Company, St. Louis, Mo., a corporation of Delaware No Drawing. Application April 2, 1956
Serial No. 575,350

8 Claims. (Cl. 260—521)

This invention relates to the carboxylation of hydroxy aromatic compounds by reacting an alkali metal salt thereof with carbon dioxide in the absence of water and more particularly pertains to the preparation of hydroxy aromatic carboxylic acid compounds.

It is well-known that hydroxy aromatic acids can be prepared by the reaction of alkali metal phenates with carbon dioxide in the absence of water. This process, which is known as the Kolbe process, is employed for the production of salicylic acid, some of the lower alkyl substituted salicylic acids and 2-hydroxy-3-naphthoic acids on an industrial scale. A process commonly employed on an industrial scale involves the preparation of the alkali metal phenate, generally a sodium phenate. The phenate in aqueous solution is added to a closed ball mill reactor and dried. Thereafter carbon dioxide is introduced into the ball mill reactor and the mixture of dry phenate and carbon dioxide is heated to a temperature in the range of 100 to 300° C. under a superatmospheric pressure of carbon dioxide until all of the phenate has been converted to the desired hydroxy aromatic carboxylic acid derivative, which is, of course, the sodium salt. This sodium salt of the hydroxy aromatic carboxylic acid must then be dissolved in water, the resulting solution acidified until the hydroxy aromatic carboxylic acid precipitates. The hydroxy aromatic carboxylic acid is then recovered by filtration, purified and dried.

It has been proposed that the carboxylation of hydroxy aromatic compounds be carried out in the presence of such solvents as paraffinic hydrocarbons, naphthalene, halogenated benzene, toluene, xylene, cyclic diethers, such as dioxane, pyridine, quinoline and lower alkyl ketones. The carboxylation of hydroxy aromatic compounds, especially the higher alkyl substituted phenolic compounds, in the presence of these solvents and in the absence of water has also been proposed.

It is known that water, alcohols and phenols are good solvents for the alkali metal phenate reactants. However, it has also been known that water is an inhibitor of the carboxylation process. It has also been suggested that alcohol inhibits the carboxylation reaction known as the Kolbe reaction.

It has now been discovered that the carboxylation of hydroxy aromatic compounds can be accomplished by reacting at a temperature of at least 120° C. carbon dioxide with an alcoholic solution containing an alkali metal salt of a hydroxy aromatic compound contained in an anhydrous solution containing the hydroxy aromatic compound and an aliphatic alcohol containing 5 or more carbon atoms. The amount of hydroxy aromatic compound in the solution should be about 0.01 mole per mole of alkali metal salt and preferably 0.1 to 5.0 moles of hydroxy aromatic compound per mole of alkali metal salt. Suitable for the purposes of this invention are, of course, the inert aliphatic alcohols containing 5 or more carbon atoms. The aliphatic alcohols preferred in the process of this invention are the alkyl alcohols containing 5 or more carbon atoms in a straight or branched hydrocarbon chain. Such alcohols which contain only carbon and hydrogen atoms in a saturated open chain and except for the oxygen in the hydroxyl group contain only carbon and hydrogen atoms are also known as alkanols. The term "alkanol" is employed hereinafter in both the specification and claims consistent with this meaning as understood in the art. Because of their availability, alkanols containing 5 to 20 carbon atoms comprise the preferred class of alkanols.

The anhydrous solution of the alkali metal salt of the hydroxy aromatic compound may be prepared by any suitable process. One method which can be used comprises reacting an alkali metal hydroxide with the hydroxy aromatic compound in the alcohol to be used. The hydroxy aromatic compound can be used in excess of that required to react with the alkali metal hydroxide or the excess may be added to the solution of the alkali metal salt after its formation in the alcohol. The water formed by the reaction of the alkali metal hydroxide and the hydroxy aromatic compound can be removed before or after adding excess hydroxy aromatic compound. Other methods of preparing an anhydrous solution of the alkali metal salt of the hydroxy aromatic compound can be used, e. g., reacting an alkali metal, such as metallic sodium, with anhydrous hydroxy aromatic compound and thereafter adding anhydrous alcohol and the excess of the hydroxy aromatic compound and thus dehydrating the resulting solution by removal of water of reaction and water introduced with the alcohol and hydroxy aromatic compound is eliminated. The process of this invention is not limited to the use of an anhydrous solution containing the alkali metal salt of the hydroxy aromatic compound prepared by any particular method. Nor is the process of this invention limited to any precise quantities of materials as long as the materials employed are used in the ratios hereinafter indicated.

In preparing the alkali metal salt an excess of the hydroxy aromatic compound amounting to from 0.01 mole to about 5.0 moles excess of the hydroxy aromatic compound per mole of alkali metal can be used so the anhydrous solution contains, in addition to the alkali metal salt of the hydroxy aromatic compound to be reacted with carbon dioxide, unreacted hydroxy aromatic compound identical with the hydroxy aromatic compound whose salt enters into the carboxylation reaction. As will be hereinafter illustrated, the recovery of the desired hydroxy aromatic carboxylic acid from the reaction medium provided by employing the carboxylation process of this invention can be readily accomplished and at the same time the remaining organic portion of the reaction medium can be recycled for use in preparation of the anhydrous solution for a subsequent carboxylation reaction. Hence the use of excess phenolic compound does not represent a loss of potential reactant. Another advantage derived from the preparation of a reaction medium containing 0.1 to 5.0 moles hydroxy aromatic compound dissolved in alcohol per mole of alkali metal salt of the hydroxy aromatic compound is that such a solution can be transported satisfactorily with the usual fluid transferring means.

The preferred solvent medium for the anhydrous solution used in the process of this invention is one containing from about 10% to about 90% by volume of the phenolic compound (determined by the volume of the phenolic compound in the liquid phase) and from about 90% to about 10% of the aliphatic alcohol (also a volume percent calculated from the volume of the alcohol in the liquid phase). The anhydrous solution most preferred for use in the process of this invention is one containing the ingredients in the proportions of one mole of alkali metal salt of hydroxy aromatic compound and two moles of hydroxy aromatic compound dissolved in an amount of the aliphatic alcohol equal in volume to the liquid phase volume of the two moles of the hydroxy aromatic compound.

The process of this invention will be hereinafter more specifically described by illustrative examples in which, unless otherwise defined, the term "parts" is employed to mean parts by weight.

Example I

A solution containing 30 parts of sodium hydroxide dissolved in 200 parts of methanol and 140 parts of iso-octyl alcohol is added to 200 parts of phenol in an iron reaction vessel fitted with a gas dispersing agitator, a jacket for heating and cooling, thermometer wells for measuring the temperature of the reaction medium, a gas charging line and a vapor outlet attached to a distillation head. The reactor is heated to distill off water and methanol to render anhydrous the solution of sodium phenate, and phenol in iso-octyl alcohol. Thereafter the resulting solution is heated to 140° C., the vapor space in the reactor flushed with nitrogen followed by flushing with carbon dioxide, the reactor sealed and charged with carbon dioxide with stirring until the pressure remains constant at about 40 pounds per square inch. The resulting mixture is held at about 150° C. and stirred for about one hour. Thereafter the reaction product is cooled to about 80° C. and the unreacted carbon dioxide bled off. To the cooled reaction mixture there is added 300 parts of water and sufficient sulfuric acid to adjust the pH to 5.5. The entire mixture is permitted to settle to form two layers. The top layer containing the phenol and iso-octyl alcohol are withdrawn and recycled for the next preparation. The water layer is further acidified to a pH of 2 or below with sulfuric acid to convert the dissolved sodium salicylate to salicylic acid which then precipitates and is recovered by filtration. The salicylic acid thus prepared has a melting point of 159.5°–160° C., contains no p-hydroxy benzoic acid, less than 0.1% 4-hydroxy isophthalic acid, and is recovered in yields in excess of 90% of the theoretical quantitative yield.

Example II

To a reactor as described in Example I there is added 214 parts of phenol, 100 parts of xylene, 110 parts of cetyl alcohol (130 parts by volume) and 64 parts of an aqueous solution containing 50% by weight sodium hydroxide. This mixture is heated to distill off the water and xylene. While the resulting anhydrous solution is being heated to 140° C., the atmosphere of the reaction vessel is purged with nitrogen and then carbon dioxide. Thereafter the reactor is sealed and carbon dioxide is charged to about 40 pounds per square inch and held at this pressure and at a temperature of 150° C. for one hour. After cooling the reaction mixture to 100° C., 200 parts of water are added and the resulting mixture stirred for 15 minutes. The pH of this mixture is adjusted to about 5 with dilute sulfuric acid, permitted to settle and the lower aqueous layer is withdrawn. The pH of the withdrawn aqueous layer is adjusted to 1.5 with dilute sulfuric acid and then cooled to about 35° C. Salicylic acid precipitates, is recovered by filtration, washed and dried. An excellent yield of salicylic acid containing little or no 4-hydroxy isophthalic acid is recovered.

Example III

An anhydrous solution containing 188 parts of phenol (176 parts by volume), 116 parts of sodium phenate, and 143 parts (176 parts by volume, molten) octadecyl alcohol is prepared in a manner similar to that hereinbefore described. This solution is reacted with carbon dioxide at 160° C. and 50 pounds per square inch pressure maintained with the carbon dioxide. From this process an excellent yield of salicylic acid is obtained having a melting point of 159°–160° C.

Example IV

An anhydrous solution containing 188 parts of phenol (176 parts by volume), 116 parts of sodium phenate, and 144 parts of amyl alcohol (175 parts by volume) is reacted with carbon dioxide at a $CO_2$ pressure of 40 pounds per square inch and 150° C. for one hour. From this process a yield of salicylic acid of 80% of the theoretical quantitative yield it recovered.

Example V

An anhydrous solution containing 375 parts of phenol (350 parts by volume), 232 parts of sodium phenate and 295 parts of isodecyl alcohol (350 parts per volume) is prepared and heated in a nitrogen atmosphere to 140° C. This solution is charged to a reactor, such as that described in Example I, charged with carbon dioxide to about 40 pounds per square inch. The reactants are stirred and maintained at 140° C. to 150° C. for about one hour at a $CO_2$ pressure of 40 pounds per square inch. Thereafter the unreacted carbon dioxide is vented, the resulting mixture cooled to 95° C., 400 parts of water are added thereto and the entire batch acidified to a pH of 5 with dilute sulfuric acid. This slightly acidic mixture is stirred for about 15 minutes and then permitted to settle. The aqueous layer is withdrawn, acidified to a pH of about 1 to 2, the precipitated salicylic acid recovered by filtration is washed and dried. There are recovered 221 parts of excellent quality salicylic acid, a yield of 80% based on the sodium phenate.

The alcohol-phenol layer is permitted to remain in the reactor and there are added thereto 188 parts of phenol and 84 parts of sodium hydroxide (95% NaOH) and 350 parts by volume of toluene. The resulting mixture is heated to distill off the toluene and water. When the solution is dry it is heated to 140° C., the vapor space flushed with nitrogen and carbon dioxide and with the solution being stirred carbon dioxide is charged to 40 pounds per square inch. The reaction is then carried out as above described and the resulting salicylic acid recovered. A product equal in quality to that recovered from the first batch is recovered.

Example VI

An anhydrous solution having the same composition as that described in Example V is heated to 150° C., mixed continuously with carbon dioxide under a carbon dioxide pressure of 40 pounds per square inch at the rate of 10 parts of the anhydrous solution and 0.5 part of carbon dioxide per minute and passed through a reactor wherein, in an initial portion, the heat of reaction can be removed and, in a latter portion of the reaction, heat may be put into the reaction mixture if needed to maintain a reaction temperature of 150° C. The dwell time of the reactants in the reactor is sufficient so that 90% of the sodium phenate is converted to sodium salicylate.

The reaction mixture issuing from the reactor is cooled to about 100° C. and mixed with water in the ratio of about 1.7 parts of reaction mixture to 1 part of water. The resulting mixture is acidified with dilute sulfuric acid to a pH of about 5, thoroughly mixed for a short period and permitted to settle to form two layers. The aqueous layer that forms is withdrawn, acidified to a pH of about 1.5 and the salicylic acid which precipitates is recovered by filtration, washed and dried. By this process there is obtained dry salicylic acid at the rate of about 24 parts per minute.

Example VII 6-methyl salicylic acid is prepared by reacting carbon dioxide with an anhydrous solution containing 216 parts of o-cresol (208 parts by volume), 130 parts of the sodium salt of o-cresol and 210 parts by volume of isodecyl alcohol at a $CO_2$ pressure of 40 pounds per square inch and a temperature of 150° C. After about one hour of reaction, the reaction mixture is cooled to a temperature of from about 80 to about 100° C. and there is added an amount of water equal to about half the volume of the reaction mixture. The resulting mixture is acidified to a pH of about 5, stirred and maintained at about 90° C. for 15 minutes and permitted to settle. The aqueous layer is recovered, acidified to a pH of about 1 with dilute sulfuric acid and the 6-methyl salicylic acid is recovered by filtration. By this process an excellent yield of 6-methyl salicylic acid is obtained.

Example VIII 2-methyl-5-isopropyl salicylic acid is prepared in an excellent yield by combining carbon dioxide with an anhydrous solution containing 300 parts by weight of thymol, 172 parts of the sodium salt of thymol and 325 parts by weight of iso-octyl alcohol at 150° C. The resulting mixture is maintained at 150° C. and a carbon dioxide pressure of about 40 pounds per square inch for about an hour. Thereafter the reaction mixture is cooled, diluted with water and acidified to a pH of 5 as hereinbefore described. The resulting water layer is removed, further acidified to a pH of about 1.5 and the precipitated 2-methyl-5-isopropyl salicylic acid is recovered.

Example IX 3-methyl-6-isopropyl salicylic acid is prepared by combining carbon dioxide with an anhydrous solution containing 172 parts sodium salt of carvacrol, 300 parts of carvacrol and 320 parts of isodecyl alcohol at 150° C. The resulting mixture is heated to 150° C. at about 40 pounds per square inch carbon dioxide pressure for about an hour. Thereafter the reaction mixture is cooled, diluted with water and acidified as hereinbefore described to a pH of 5. The resulting water layer is removed, further acidified to a pH of 1.5 and the 3-methyl-6-isopropyl salicylic acid is recovered.

Example X 3,5-dichloro salicylic acid is prepared by combining carbon dioxide with an anhydrous solution heated to 140° C. and contains 325 parts of 2,4-dichloro phenol, 185 parts of sodium 2,4-dichloro phenate and 230 parts by volume of iso-octyl alcohol. The resulting mixture is stirred, maintained at about 150° C. under a carbon dioxide pressure of 40 pounds per square inch for about an hour. The desired dichloro salicylic acid is recovered by a process similar to that hereinbefore described.

By following the practices of this invention as illustrated in the above specific examples other substituted salicylic acids (substituted hydroxy benzoic acids) can be prepared. For example, p-amino salicylic acid can be prepared from m-amino phenol. Also 5-tertiary butyl salicylic acid can be prepared from 4-tertiary butyl phenol; 3-methyl-5-isopropyl salicylic acid; 4-methyl-3-isoamyl salicylic acid; 3-methyl-4-isopropyl salicylic acid; 4-hexyl salicylic acid; 5-phenyl salicylic acid from p-phenyl phenol; 5-benzyl phenol; 5-benzyl salicylic acid from p-benzyl phenol can be prepared. Now likewise, there can be employed in the process of this invention a monochloro phenol; 2-chloro p-cresol; 2-methyl-5-chloro phenol; 3-methyl-4-isopropyl phenol; 3-methyl-4-chloro phenol and the like can be employed as reactants in the process of this invention. Other phenols which can be employed in addition to those hereinbefore named are nitro phenols; naphthols; 2-hydroxy diphenyl; 4-hydroxy diphenyl; 2-anthro; 1,2-dihydroxy benzene; 1,5-dihydroxy naphthalene; such higher alkyl phenols as 3-penta decenyl phenol which is derived from cashew nutshell oil; the $C_{12}$ alkyl substituted phenol derived by alkylation of phenol with propylene tetramer, among others.

In addition to the alcohols employed in the above specific examples there can also be employed such other alcohols as nonanol-2, lauryl alcohol, dodecyl alcohol, as well as some of the higher melting alcohols such as pentadecyl alcohol, octa-decyl alcohol and eicosyl alcohol.

The temperature at which the carboxylation process of this invention can be carried out varies from at least 120° C. to about 200° C. or higher. It will be found that the use of temperatures of 200° C. or higher, although not inhibiting carboxylation, will create special problems of equipment design otherwise avoided by the process of this invention. As illustrated hereinbefore, the use of reaction temperatures of from 140° to 160° C. results in reaction rates sufficiently high to provide efficient processes. Also it will be found that optimum yields are obtained when the reactants are combined at the most efficient temperature of absorption of carbon dioxide which appears to be in the range of 140° C. to 160° C. However, yields still superior to the prior practices can be achieved employing temperatures as low as 120° C. and, of course, using temperatures above 160° C. provides higher reaction rates.

While the invention disclosed herein has been described and illustrated in terms of the use of specific materials, precise quantities of reactants and diluents, precise rates of addition and precise conditions of temperature and pressure, it is not desired that this invention be limited solely thereto, for as hitherto stated, obvious variations from any of the precise conditions and the use of equivalent reactants and diluents can be employed if desired without departing from the spirit and scope of this invention as defined in the appended claims.

What is claimed is:

1. In a process for carboxylating an hydroxy aromatic compound by reacting an alkali metal salt thereof with carbon dioxide in the absence of water, the step comprising reacting, at temperatures of at least 120° C., carbon dioxide with an alkali metal salt of the hydroxy aromatic compound in an anhydrous medium comprising hydroxy aromatic compound and aliphatic alcohol containing at least 5 and not more than 20 carbon atoms.

2. In a process for carboxylating an hydroxy aromatic compound by reacting an alkali metal salt thereof with carbon dioxide in the absence of water, the step comprising reacting, at temperatures of about 120° C. to about 200° C., carbon dioxide under super-atmospheric pressure with alkali metal salt of the hydroxy aromatic compound contained in an anhydrous medium comprising alkanol containing at least 5 and not more than 20 carbon atoms and up to about 5 mols of hydroxy aromatic compound for each mol of said alkali metal salt.

3. In a process for carboxylating a phenol by reacting a sodium salt thereof with carbon dioxide, the step comprising reacting, at temperatures of at least 120° C., carbon dioxide with said salt in an anhydrous medium comprised of said phenol and alkanol containing from 5 to 20 carbon atoms.

4. In a process for preparing salicylic acid by reacting sodium phenate with carbon dioxide in the absence of water, the step comprising reacting, at temperatures within the range of about 120° C. to about 200° C., carbon dioxide under super-atmospheric pressure with sodium phenate contained in an anhydrous solution comprising alkanol containing at least 5 and not more than 20 carbon atoms and up to about 5 mols of phenol for each mol of sodium phenate.

5. In a process for preparing salicylic acid by reacting sodium phenate with carbon dioxide in the absence of water, the steps comprising, within a zone capable of confining super-atmospheric pressures, introducing carbon dioxide as required to maintain pressures of at least 3 atmospheres (absolute) while reacting carbon dioxide at temperatures within the range of about 140° C. to about 200° C. with sodium phenate in an anhydrous medium comprised of alkanol containing from 5 to 20 carbon atoms and from about 2 to about 5 mols of phenol for each mol of sodium phenate, about 1 to about 10 volumes of said alkanol being present for each volume of phenol.

6. In a process for preparing salicylic acid by reacting sodium phenate with carbon dioxide in the absence of water, the steps comprising, within a zone capable of confining super-atmospheric pressures, introducing carbon dioxide as required to maintain pressures of at least 3 atmospheres (absolute) while reacting carbon dioxide at temperatures within the range of about 140° C. to about 200° C. with sodium phenate in an anhydrous medium comprised of an alkanol containing 8 carbon atoms and from about 2 to about 5 mols of phenol for each mol of sodium phenate, about 1 to about 10 volumes of said alkanol being present for each volume of phenol.

7. In a process for preparing salicylic acid by reacting sodium phenate with carbon dioxide in the absence of water, the steps comprising, within a zone capable of confining super-atmospheric pressures, introducing carbon dioxide as required to maintain pressures of at least 3 atmospheres (absolute) while reacting carbon dioxide at temperatures within the range of about 140° C. to about 200° C. with sodium phenate in an anhydrous medium comprised of an alkanol containing 10 carbon atoms and from about 2 to about 5 mols of phenol for each mol of sodium phenate, about 1 to about 10 volumes of said alkanol being present for each volume of phenol.

8. In a process for carboxylating a cresol, the step comprising reacting a sodium cresylate with carbon dioxide at temperatures of from about 120° C. to about 200° C., the sodium cresylate being admixed with an anhydrous alkanol containing from 5 to 20 carbon atoms and up to about 5 mols of cresol per mol of sodium cresylate.

References Cited in the file of this patent

FOREIGN PATENTS 384,619   Great Britain _____ Dec. 8, 1932

OTHER REFERENCES

Surrey: Name Reactions in Organic Chemistry, pp. 107–108 (1954).